United States Patent
Fukushima

(10) Patent No.: US 9,482,541 B2
(45) Date of Patent: Nov. 1, 2016

(54) NAVIGATION SYSTEM

(71) Applicant: TOYOTA JIDOSHA KABUSHIKI KAISHA, Toyota-shi, Aichi-ken (JP)

(72) Inventor: Toru Fukushima, Kawasaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/949,175

(22) Filed: Nov. 23, 2015

(65) Prior Publication Data

US 2016/0265923 A1  Sep. 15, 2016

(30) Foreign Application Priority Data

Mar. 13, 2015  (JP) .................. 2015-050672

(51) Int. Cl.
*G01C 21/34* (2006.01)
*G01C 21/36* (2006.01)

(52) U.S. Cl.
CPC ............. *G01C 21/34* (2013.01); *G01C 21/367* (2013.01)

(58) Field of Classification Search
CPC .............................. G01C 21/34; G01C 21/367
USPC ........................................................ 701/428
See application file for complete search history.

(56) References Cited

U.S. PATENT DOCUMENTS

| | | | |
|---|---|---|---|
| 2013/0166209 A1* | 6/2013 | Pollington | G06Q 10/06 701/540 |
| 2016/0047660 A1* | 2/2016 | Fausten | B60W 50/12 701/25 |
| 2016/0082978 A1* | 3/2016 | Ozaki | G01C 21/34 701/58 |
| 2016/0109551 A1* | 4/2016 | Faragher | G01S 5/0263 701/23 |
| 2016/0138925 A1* | 5/2016 | Takahashi | B60L 11/1809 701/533 |
| 2016/0155310 A1* | 6/2016 | Joao | G08B 21/02 340/573.1 |
| 2016/0209842 A1* | 7/2016 | Thakur | G01C 21/34 701/25 |
| 2016/0209843 A1* | 7/2016 | Meuleau | G05D 1/0088 701/25 |
| 2016/0209845 A1* | 7/2016 | Kojo | G05D 1/0225 701/25 |

FOREIGN PATENT DOCUMENTS

| | | |
|---|---|---|
| JP | 2004-245609 A | 9/2004 |
| JP | 2005-276070 A | 10/2005 |
| JP | 2007-170927 A | 7/2007 |
| JP | 2007-322304 A | 12/2007 |
| JP | 2008-102024 A | 5/2008 |
| JP | 2009-63422 A | 3/2009 |

OTHER PUBLICATIONS

Communication dated Aug. 17, 2016 from the European Patent Office in counterpart Application No. 16153448.2.

* cited by examiner

*Primary Examiner* — McDieunel Marc
*Assistant Examiner* — James E Stroud
(74) *Attorney, Agent, or Firm* — Sughrue Mion, PLLC

(57) ABSTRACT

A required time calculator calculates a virtual required time period when a first movable body is assumed to travel a second route different from a first route the first movable body actually travels and arrive at a second point. The required time calculator preferentially acquires position information from a second movable body having information indicating a movement characteristic similar to information indicating the movement characteristic of the first movable body from among one or more of second movable bodies. The required time calculator calculates the virtual required time period using the acquired position information.

5 Claims, 8 Drawing Sheets

NAVIGATION SYSTEM

BACKGROUND OF THE DISCLOSURE

The present disclosure relates to a navigation system capable of estimating a time period required for a movable body to move between any given points. The navigation system is also capable of estimating a time period required for movement along a route different from that of the movable body.

As is generally known, navigation systems mounted on vehicles search for a route from a place of departure to a destination and provide guidance on the found route to users. However, conventionally, when a vehicle leaves an initial route guided by a navigation system and arrives at a destination via an alternative route, even if the user wants to compare required time periods when the vehicle leaves the initial route and arrives at the destination and when the vehicle arrives at the destination without leaving the initial route, the user has no way to make such a comparison.

In contrast, a system has been proposed that transmits an agent program to another vehicle traveling along a route different from the route of the host vehicle to set the other vehicle as a virtual vehicle (e.g., see Japanese Laid-Open Patent Publication No. 2004-245609). In this system, the virtual vehicle, which has received the agent program, transmits a traveling result to the vehicle that is the transmission source of the agent program though a function of the agent program. When the virtual vehicle, which has received the agent program, leaves the alternative route it is traveling, the virtual vehicle transfers the agent program to a third vehicle that is traveling the route. Thus, the third vehicle, which has received the agent program, is newly set as a virtual vehicle and transmits the traveling result to the host vehicle, which is the transmission source of the agent program.

According to the above-described system, even if a vehicle that is a virtual vehicle leaves the route to be compared, another vehicle traveling the route is set as a virtual vehicle. It is thus possible to calculate a required time period that reflects changing factors such as congestion and traffic control.

However, the vehicle that has received the agent program does not always display the same traveling performance as that of the host vehicle. Therefore, even when the time period required by the virtual vehicle is calculated using the traveling result of the vehicle that has received the agent program, it is difficult to bring the required time period calculated in this way closer to the required time period when the host vehicle actually travels along the alternative route. Such a problem is not limited to navigation systems mounted on vehicles or other movable bodies, but is generally common to navigation systems or the like incorporated in portable information terminals, for example.

It is an objective of the present invention to provide a navigation system capable of obtaining, even for a route along which a movable body does not actually move, results similar to results that would be obtained if the movable body actually moved along the route.

SUMMARY

In accordance with one aspect of the present disclosure, a navigation system capable of acquiring a first required time period and a second required time period is provided. The first required time period is a time period required for a first movable body to arrive at a second point from a first point via a first route and the second required time period is a time period required for a second movable body moving along a second route different from the first movable body to arrive at the second point from the first point. The navigation system includes a storage section, a movement characteristic information acquiring section, and a required time calculator. The storage section stores information indicating respective movement characteristics of the first movable body and the second movable body. The information is defined in advance and the movement characteristics are classified by one or more factors that affect an arrival time when the first movable body and the second movable body travel an identical route. The movement characteristic information acquiring section is configured to acquire the information indicating the movement characteristics of the first movable body and the information indicating the movement characteristics of the second movable body from the storage section. The required time calculator calculates a third required time period which is a virtually required time period when the first movable body is assumed to arrive at the second point after movement the second route, which is different from the first route, along which the first movable body actually has moved. The second movable body, which has passed through the first point as in the case of the first movable body, is one or more second movable bodies. The required time calculator is configured to preferentially acquire position information from the second movable body having the information indicating a movement characteristic similar to the information indicating the movement characteristic of the first movable body from among the one or more second movable bodies. The required time calculator is configured to calculate the third required time period using the acquired position information.

In the above-described configuration, position information is acquired preferentially from a second movable body having information indicating a movement characteristic similar to that of the first movable body from among one or more of second movable bodies that have passed through the first point in the same way as the first movable body. That is, this position information reflects the movement characteristic similar to that of the first movable body and also reflects the traffic situation or the like of the second route. Therefore, it is possible to obtain results similar to results that would be obtained if the first movable body actually moved along the second route, by calculating a time period required to reach the second point using this position information. Therefore, the user is allowed to determine the appropriateness of the route selected by the user through a comparison between the actual required time period to reach the second point via the first route and the required time period virtually calculated with respect to the second route.

As a comparative example, in order to compare the route along which the host vehicle actually has traveled with an alternative route, a system may be considered in which another vehicle in the vicinity of the host vehicle is set as a virtual vehicle and a required time period for the virtual vehicle to arrive at the destination is calculated. This type of system sets another vehicle traveling along an alternative route as a virtual vehicle, acquires the position of the virtual vehicle via wireless communication, and compares the required time period for the host vehicle and the required time period for the virtual vehicle using the acquired position. Thus, by acquiring data in real time from the other vehicle traveling along the alternative route in the same time period of day as that of the host vehicle, it is possible to make a comparison that reflects changing factors such as congestion, traffic control and the like.

However, the following problem occurs when collecting data by setting the virtual vehicle. That is, the other vehicle that is set as the virtual vehicle is not always directed to the same destination as that of the host vehicle. Therefore, when the virtual vehicle leaves the route directed to the destination, it is not possible to calculate the required time period although it is a virtual one. The present disclosure will solve such a problem.

In accordance with one form of the present disclosure, the navigation system preferably includes a notification consignment transmitting section, which transmits notification consignment to the one or more second movable bodies, which have the information indicating a movement characteristic similar to the information indicating the movement characteristic of the first movable body. The second movable body that has received the notification consignment is consigned to notify the required time calculator of the position information. When the second movable body that has received the notification consignment leaves the second route directed to the second point, the notification consignment transmitting section generates the notification consignment such that the second movable body acquires the information indicating movement characteristics of other one or more movable bodies on the second route directed to the second point. The notification consignment transmitting section generates the notification consignment such that the second movable body leaving the second route transmits the notification consignment to a mobile unit having the information indicating a movement characteristic similar to that of the first movable body from among the other one or more movable bodies.

In the above-described configuration, even when the second movable body that receives notification consignment and notifies the required time calculator of position information leaves the second route directed to the second point, consignment of notification of the position information is transmitted to another movable body having information indicating a movement characteristic similar to that of the first movable body. Therefore, since notification consignment can be exchanged among a plurality of movable bodies having movement characteristics similar to that of the first movable body in a relay fashion, it is possible to obtain results similar to results in a case in which the first movable body actually moves along the route.

In accordance with one form of the present disclosure, the required time calculator is preferably configured to predict the first required time period using the position of the first movable body, and the required time calculator is preferably configured to predict the second required time period using the position information notified from the second movable body. Also, the navigation system further preferably includes a display section, which is configured to display a mark indicating a result of comparison between the first required time period and the second required time period on a map image.

As the first movable body moves away from the second movable body, the map tends to be scaled down so as to display their positions simultaneously within one map image, and so a wide-area map is displayed. When the map scale is smaller than the scale specified by the user, the function that should originally guide the route up to the second point may not be exerted. In this respect, in the above-described configuration, marks that can identify comparison results of predicted required time periods are displayed on a map image, and it is thereby possible to notify the user of the difference in the predicted required time periods without changing the scale of the map image.

In accordance with one form of the present disclosure, the storage section preferably stores, as the information indicating the movement characteristic, information indicating at least one of: movable body static information, which is static information related to the first movable body and the second movable body; movable body dynamic information, which is changing information related to the first movable body and the second movable body including an average speed or the number of occupants of the movable bodies; and user information related to the respective users of the first movable body and the second movable body.

In the above-described configuration, the second movable body having a movement characteristic similar to that of the first movable body includes at least one of movable body static information related to the movable body, movable body dynamic information that is changing information related to the movable body including the average speed and the number of occupants of the movable body, and user information related to the user of the movable body. Therefore, by using the position information of the selected movable body, it is possible to obtain results similar to the results in a case in which the first movable body actually moves along the route.

In accordance with one form of the present disclosure, the navigation system preferably includes a movement time calculator, an average movement time acquiring section, and a traveling result evaluation section. The movement time calculator is configured to calculate a movement time for the second movable body from the movement result of the second movable body. The movement time calculator is configured to calculate a movement time for the second movable body for each of a plurality of sections into which the route the second movable body travels is divided. The average movement time acquiring section is configured to acquire an average movement time associated with the section. The traveling result evaluation section is configured to compare a movement time calculated for each section and the average movement time. The traveling result evaluation section is configured to notify the user of the first movable body of a section longer than the average movement time or a section shorter than the average movement time.

In the above-described configuration, notification is made of a section where the actual movement time is longer than the average movement time, or a section where the actual movement time is shorter than the average movement time from the movement results of the second movable body. Therefore, while figuring out which is longer or shorter: the actual required time period required to reach the second point via the first route or the required time period required to reach the second point via the second route, the user of the first movable body can know which section is a factor of delay or a factor of reducing the required time period in the case of passing through the second route.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DESCRIPTION OF THE PREFERRED EMBODIMENTS

First Embodiment

Hereinafter, a navigation system 12 according to a first embodiment will be described. The navigation system 12 according to the present embodiment calculates a first required time period as a required time period for a host vehicle 11, which is a first movable body, to arrive at a second point from a first point and a second required time period as a required time period for another vehicle, which is a second movable body, to arrive at the second point from the first point after passing through a route different from that of the host vehicle.

Figure 1:
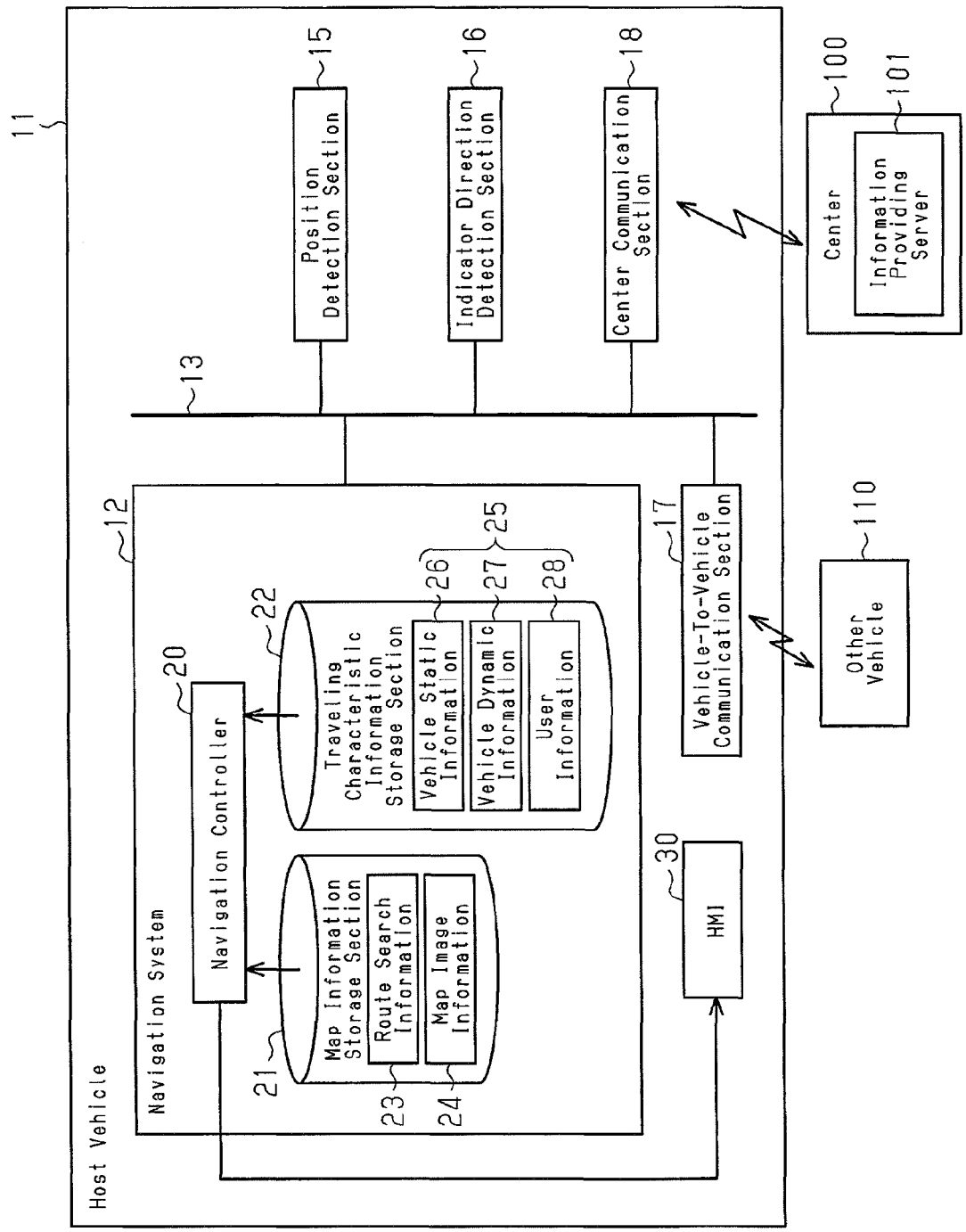
FIG. 1 is a block diagram illustrating a schematic configuration of a navigation system according to a first embodiment.

As shown in FIG. 1, the navigation system 12, which is mounted on the host vehicle 11, is connected to a position detection section 15 and an indicator direction detection section 16 via a vehicle-mounted network 13. The position detection section 15 detects the position of the host vehicle 11, and is provided with at least one of a positioning sensor that receives a signal from a satellite positioning system such as a GPS (global positioning system), an orientation sensor that detects an orientation, a vehicle speed sensor that detects the vehicle speed, and a communication device that receives the position through road-to-vehicle communication or the like.

The indicator direction detection section 16 is a sensor or a computer that detects an indicator direction of the directional indicator operated by a user.

The navigation system 12 is further connected to a vehicle-to-vehicle communication section 17 and a center communication section 18 via the vehicle-mounted network 13. The vehicle-to-vehicle communication section 17 performs vehicle-to-vehicle communication with another vehicle 110 located within a communication distance via wireless LAN (local area network) of a predetermined standard, for example. The center communication section 18 communicates with an information providing server 101 installed in a center 100 via a public channel or the like.

A human machine interface (HMI) 30, which receives operation from the user of the host vehicle 11 and broadcasts information to the user, is connected to the navigation system 12. The HMI 30 outputs information provided by the navigation system 12 and receives a command by the user's input operation. The HMI 30 includes a display as a display section provided in the vicinity of a driver's seat. The HMI 30 may also include at least one of a display section provided on an instrument panel, a head-up display, and a speaker, which outputs sound. The input section that inputs commands is at least one of a touch panel provided on the display, operation buttons provided together on the display, and a speech recognition device or the like.

Next, the configuration of the navigation system 12 will be described. The navigation system 12 is provided with a navigation controller 20, a map information storage section 21 and a traveling characteristic information storage section 22. The navigation controller 20 is provided with a calculator and a storage section, and the calculator performs various kinds of control according to programs stored in the storage section. The programs stored in the storage section include a required time period calculation program. This required time period calculation program is a program that consigns, when the host vehicle leaves a preset initial route, notification of position information to another vehicle traveling along the initial route. The calculator of the navigation controller 20 is constructed by ECUs (Electronic Control Units).

The map information storage section 21 stores route search information 23 and map image information 24. The route search information 23 includes node data, which is information for searching for a route from a place of departure to a destination and related to a node set at an intersection or a branch point, link data related to links set among a plurality of nodes, and road attribute information such as the advancing direction, the number of lanes, the road type or the like. The map image information 24 is image information for drawing a map image on the display, which is included in the HMI 30.

The traveling characteristic information storage section 22 stores traveling characteristic information 25 as movement characteristic information. The traveling characteristic information 25 is information indicating a traveling characteristic of the host vehicle and includes vehicle static information 26, vehicle dynamic information 27, and user information 28.

The vehicle static information 26 is information indicating a movement characteristic of the host vehicle and is static information related to the host vehicle. The vehicle static information 26 includes not only the vehicle width and the overall length but also vehicle class information such as minivan wagon or sport type. Vehicles having similar vehicle static information 26 tend to have similar required time periods when traveling the same route. For example, when a vehicle and an oncoming vehicle having substantially the same vehicle width pass each other on a narrow road, their required time periods for passing each other are estimated to be similar. Furthermore, when a vehicle turns a corner of a narrow road, since the necessity for reversing the steering direction differs depending on the size of the wheel base, vehicles of the same vehicle class tend to have similar required time periods for passing through such a corner. Moreover, since vehicles of the same vehicle class tend to have the same field of view from the driver's seat, acceleration performance or the like, their required time periods tend to be close to each other over the entire route. The vehicle static information 26 corresponds to movable body static information.

The vehicle dynamic information 27 is information indicating the movement characteristic of the host vehicle and is information that changes depending on the situation. The vehicle dynamic information 27 includes the most recent average speed, the number of occupants or the like. The most recent average speed is a speed obtained by averaging vehicle speeds of the most recent predetermined time period or the most recent predetermined traveling distance. The number of occupants is the number of people riding on the host vehicle, and is the number of people inputted by the user or the number of people calculated based on a detection result of a seat sensor provided on each seat. Vehicles having similar vehicle dynamic information 27 tend to have similar required time periods when traveling the same route. For example, when the most recent average speeds are the same, it is possible to estimate that users have similar operation tendencies, and when the vehicles travel along the same route, they tend to have similar required time periods. When the numbers of occupants are the same, since tendencies of starting moving and stopping are estimated to be similar, when the vehicles travel along the same route, they tend to have similar required time periods. The vehicle dynamic information 27 corresponds to movable body dynamic information.

The user information 28 is information related to the user who drives the host vehicle and has the driving characteristic and the driving skill of the user. The driving characteristic shows tendencies of the user's driving. For example, the driving characteristic shows a driving tendency of keeping the vehicle speed while repeating changes of lanes or a driving tendency of traveling on the same lane without changing lanes. This driving characteristic may be a characteristic learned by the navigation system 12 or a characteristic registered by the user. The driving skill is one determined according to the date of obtaining the license, age or the like. The user information 28 may be stored for each user who drives the host vehicle. Vehicles having similar user information 28 tend to have similar required time periods when traveling the same route. For example, if the drivers have the same driving characteristic or driving skill, since they are estimated to have similar tendencies such as obstacle avoiding behavior, vehicle speed, braking operation, acceleration operation or the like, they tend to have similar required time periods when traveling the same route.

Figure 2:
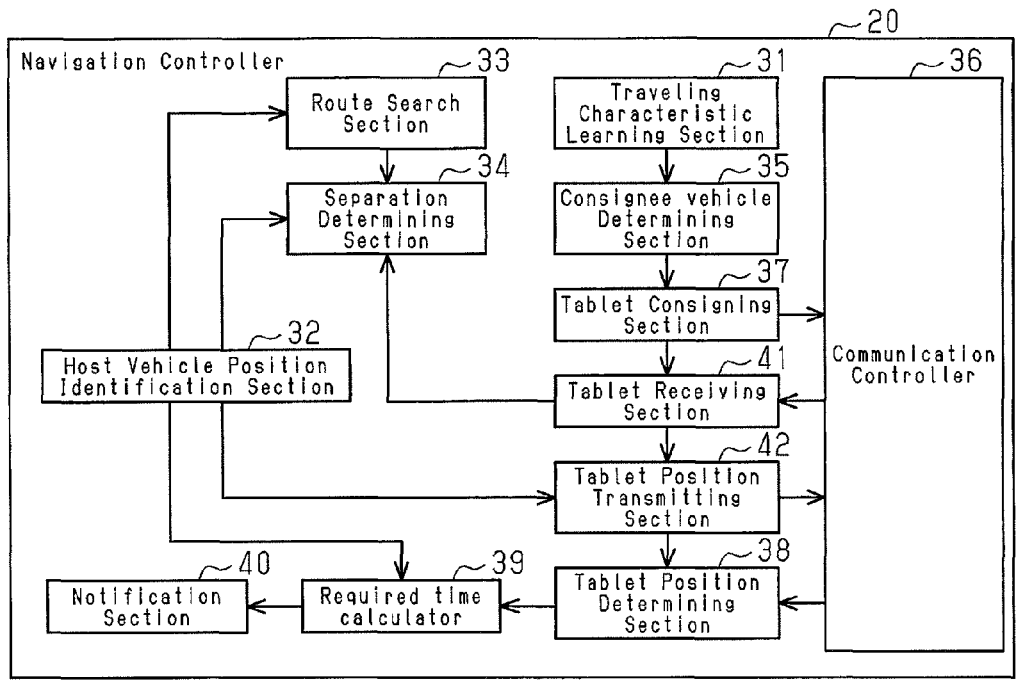
FIG. 2 is a functional block diagram illustrating functions of the navigation controller of the above-described embodiment.

With reference to FIG. 2, functions of the navigation controller 20 will be described. Each function described below is exerted by the calculator (ECUs) of the navigation controller 20 executing processes according to programs stored in the storage section.

A traveling characteristic learning section 31 acquires a vehicle speed from the vehicle speed sensor, which is part of the position detection section 15 and learns the most recent average speed or a driving characteristic or the like. The learned user traveling characteristic is stored as user information 28 in the traveling characteristic information storage section 22.

A host vehicle position identification section 32 identifies the host vehicle position based on the vehicle position inputted from the position detection section 15. A route search section 33 searches for a route from a place of departure to a destination using the host vehicle position inputted from the host vehicle position identification section 32 and the route search information 23. The found route or the found routes are outputted to the HMI 30 and one of them is set by the user as an initial route.

A separation determining section 34 predicts a traveling direction of the vehicle based on the traveling direction of the initial route inputted from the route search section 33 and a detection signal inputted from the indicator direction detection section 16. Although the traveling direction along the initial route is a direction in which the vehicle travels straightforward through an intersection ahead of the host vehicle or a branch point, if a detection signal indicating a left turn or a right turn is inputted from the indicator direction detection section 16, it is determined that the host vehicle is likely to have left the initial route. On the other hand, although the traveling direction along the initial route is a direction corresponding to a left turn at an intersection ahead of the host vehicle or a branch point, if no direction indicating signal has been received from the indicator direction detection section 16 or if an indication for a right turn has been inputted, it is determined that the host vehicle is likely to have left the initial route.

Even when no indicator direction is inputted, the separation determining section 34 determines whether the position of the host vehicle is on the initial route and determines whether the vehicle has actually left the initial route. When the separation determining section 34 determines that the intention of the user's direction indication is a change of lanes, parking on the road, stop at a facility located along the initial route or the like and the position of the host vehicle is on the initial route, the separation determining section 34 determines that the host vehicle is traveling the initial route even after determining that the host vehicle is likely to have left the initial route. The determination as to whether the host vehicle has left the initial route is made based on whether the host vehicle is located on a link of an alternative route, not on a link indicating the initial route or whether the host vehicle has moved away from the initial route by a predetermined distance or more.

When the host vehicle leaves the initial route, a consignee vehicle determining section 35 as a movement characteristic information acquiring section searches for another vehicle storing the same program as the required time period calculation program stored in the host vehicle 11 via a communication controller 36. The communication controller 36 controls communication between the navigation controller 20 and the vehicle-to-vehicle communication section 17, and the center communication section 18. The search for another vehicle by the consignee vehicle determining section 35 is performed mainly through vehicle-to-vehicle communication but may also be performed through communication via the center 100.

The consignee vehicle determining section 35 selects other vehicles directed toward the same traveling direction as the traveling direction along the initial route from among other vehicles detected by the search and then selects one vehicle from among the selected other vehicles. In selecting one vehicle, the consignee vehicle determining section 35 acquires traveling characteristic information 25 of the host vehicle via the traveling characteristic learning section 31. The consignee vehicle determining section 35 acquires traveling characteristic information of the other vehicles and route information set in the other vehicles from the selected other vehicle or the selected other vehicles. The consignee vehicle determining section 35 then preferentially selects other vehicles having traveling characteristic information similar to that of the host vehicle from among the other vehicles whose traveling characteristic information and route information have been acquired. When no route is set in the other vehicles, the most recent traveling direction of the other vehicles may be designated as the route information instead of the set route. That is, the consignee vehicle determining section 35 selects another vehicle that satisfies at least one of the following items (a) to (f) as a consignee vehicle.

(a) That the vehicle travels the longest distance in the initial route (b) That at least one of the vehicle width, the overall length, and the vehicle class is the same as that of the host vehicle (c) That the difference from the most recent average speed of the host vehicle falls within a predetermined range (d) That the number of occupants is the same as that of the host vehicle (e) That the driver's skill is the same as that of the host vehicle (f) That the driver's driving tendency is the same as that of the host vehicle Among the items (a) to (f), the item (a) has the highest priority. The priority decreases thereafter in order of the item (b) related to vehicle static information 26, the items (c), (d) related to vehicle dynamic information 27, and the items (e), (f) related to user information 28. The vehicle static information 26 is static information and has high reliability, and therefore has high priority, whereas the vehicle dynamic information 27 and the user information 28 are changing information, and therefore have low priority. Scores are defined for the items (a) to (f) according to the priority. When two or more vehicles are detected, the consignee vehicle determining section 35 sums up scores of the items (a) to (f) satisfied by the other vehicles, calculates the total score, and selects a vehicle having the highest score.

The vehicle selected in this way is designated as a consignee vehicle to which notification of the position information to the navigation system 12 of the host vehicle 11 is consigned. A tablet consigning section 37 as a notification consignment transmitting section transmits tablet information 50, which is notification consignment of position information, to a consignee vehicle via the communication controller 36. The tablet information 50 is similar to a so-called tablet block used in railway or the like, and the other vehicle that receives this tablet information 50 hands over the tablet information 50 to a different vehicle when leaving the initial route.

Figure 3:
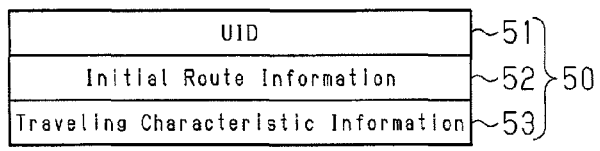
FIG. 3 is a conceptual diagram illustrating an example of a configuration of tablet information that is notification consignment.

As shown in FIG. 3, the tablet information 50 transmitted from the host vehicle includes UID 51, which is a unique ID of the transmission source user of the tablet information 50 or the host vehicle, initial route information 52 indicating the initial route and traveling characteristic information 53 of the host vehicle. The traveling characteristic information 53 is information read from the traveling characteristic information storage section 22 and includes the vehicle static information 26, the vehicle dynamic information 27, and the user information 28.

When direction indication by the user of the host vehicle is intended to be a change of lanes, parking on the street or the like, the separation determining section 34 may determine, after transmitting the tablet information 50, that the host vehicle does not leave but continues to travel the initial route. In that case, the tablet consigning section 37 sends a request for canceling the tablet information 50 to the destination vehicle. The consignee vehicle that receives the cancel request either discards the received tablet information 50 or returns the tablet information 50.

A tablet position determining section 38 shown in FIG. 2 determines the position of the consignee vehicle based on the position information received from the consignee vehicle. A required time calculator 39 calculates a required time period for the consignee vehicle to arrive at the destination and a required time period for the host vehicle to arrive at the destination using the remaining distance from the position of the consignee vehicle to the destination and the remaining distance from the position of the host vehicle to the destination. This required time period is calculated by dividing each remaining distance by the average traveling speed or legally prescribed speed or the like stored in the route search information 23.

A notification section 40 provides notice of which of the required time period for the consignee vehicle to arrive at the destination or the required time period for the host vehicle to arrive at the destination is shorter via the HMI 30. In this case, the notification section 40 notifies the user of the required time period for the consignee vehicle substituted by the required time period for the host vehicle to travel the initial route. Speech notifying how much the required time period for the route the vehicle actually has traveled is shorter or longer than the required time period of the initial route is outputted from a speaker by saying, for example, "This route precedes the initial route by 10 minutes." Furthermore, results of a comparison between the required time period when the vehicle travels the initial route and the required time period when the vehicle leaves the initial route are displayed on the display in an identifiable manner.

In contrast, when the host vehicle is selected as a consignee vehicle and the navigation system 12 receives the tablet information 50, the following process is performed. The same procedure upon receiving the tablet information 50 is applied to not only the host vehicle but also other vehicles having the required time period calculation program. A tablet receiving section 41 analyzes the tablet information 50 received via the communication controller 36. A tablet position transmitting section 42 acquires a UID 51 of the tablet information 50 from the tablet receiving section 41 and transmits the position information of the host vehicle to a vehicle having the UID 51 as the destination. Upon receiving a command from the tablet receiving section 41, the separation determining section 34 determines whether the host vehicle has left the route based on the initial route information 52 included in the tablet information 50.

When the separation determining section 34 determines that the host vehicle selected as a consignee vehicle has left the initial route indicated by the tablet information 50, the consignee vehicle determining section 35 selects a new consignee vehicle. The method of selecting an consignee vehicle is substantially the same as that in the case where the host vehicle transmits the tablet information 50, but the method selects a vehicle having traveling characteristic information similar to the traveling characteristic information of the transmission source vehicle of the tablet information 50 instead of selecting a vehicle having traveling characteristic information similar to the traveling characteristic information 25 of the host vehicle. At this time, the consignee vehicle determining section 35 acquires the traveling characteristic information 53 included in the tablet information 50 and also receives the route information and traveling characteristic information from the other vehicle, and newly selects a vehicle having traveling characteristic information similar to the traveling characteristic information 53 of the transmission source vehicle as a consignee vehicle.

When a consignee vehicle is newly selected in this way, the tablet consigning section 37 of the host vehicle transmits the tablet information 50 to the new consignee vehicle, also transmits the tablet information 50 to the transmission source vehicle, and thereby cancels the setting of a consignee vehicle. The setting of a consignee vehicle may also be canceled by discarding the tablet information 50.

Next, an example of exchange of the tablet information 50 will be described with reference to FIGS. 4 and 5. Suppose that the host vehicle 11 is traveling from the place of departure to the destination along the initial route.

Figure 4:
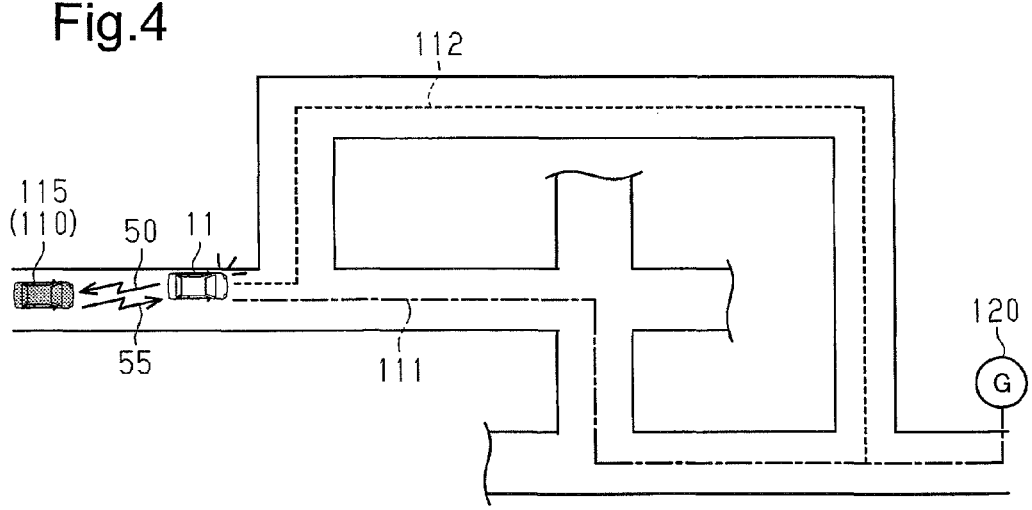
FIG. 4 is a schematic view illustrating an example of exchange of tablet information between the host vehicle and a consignee vehicle.

As shown in FIG. 4, for example, when it is predicted that, based on operation of the directional indicator of the host vehicle 11 or the like, the host vehicle 11 will leave an initial route 111 and the host vehicle 11 will travel an alternative route 112, which is different from the initial route 111, the consignee vehicle determining section 35 searches for the other vehicle 110 storing the required time period calculation program through vehicle-to-vehicle communication and selects an consignee vehicle 115 from among other vehicles 110. The tablet consigning section 37 transmits the tablet information 50 to the consignee vehicle 115 via the communication controller 36. The initial route 111, which the host vehicle 11 has left, corresponds to a second route, and the alternative route 112, which the host vehicle 11 actually travels, corresponds to a first route.

The consignee vehicle 115, which has received the tablet information 50, executes a process according to a required time period calculation program while traveling the initial route 111 of the host vehicle, and thereby transmits position information 55 to the host vehicle 11, which is the transmission source of the tablet information 50. The tablet position determining section 38 of the host vehicle 11 receives the position information 55. The required time calculator 39 of the host vehicle 11 calculates a first required time period for the host vehicle 11 to arrive at a destination 120 and a second required time period for the consignee vehicle 115 to arrive at the destination 120.

By executing a process according to the required time period calculation program, the consignee vehicle 115 determines whether the consignee vehicle 115 will leave the initial route using the initial route information 52 included in the received tablet information 50.

Figure 5:
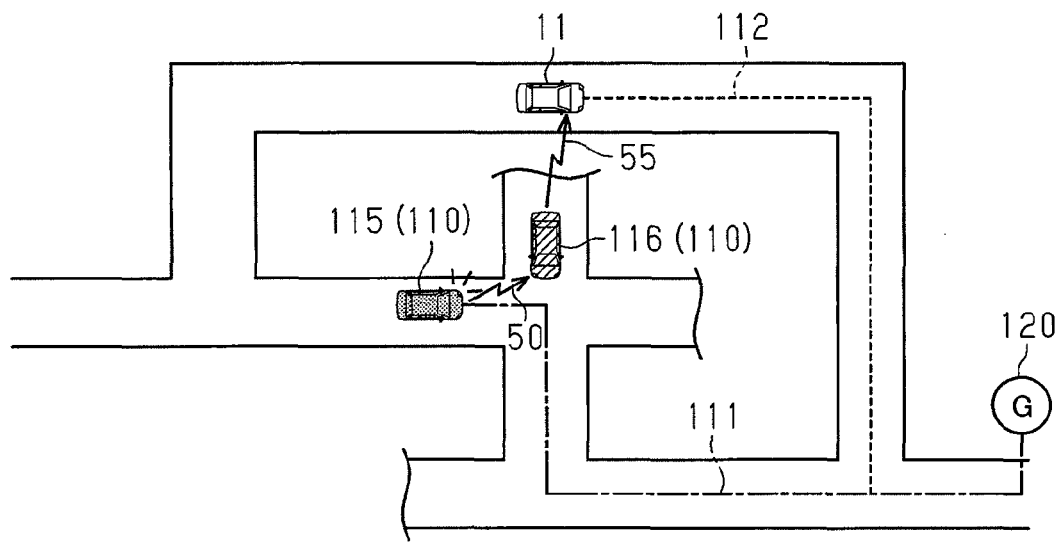
FIG. 5 is a schematic view illustrating an example of exchange of tablet information between the consignee vehicle and a new consignee vehicle.

As shown in FIG. 5, when it is predicted, based on, for example, operation of the directional indicator in the consignee vehicle 115, that the consignee vehicle 115 will leave the initial route 111, the consignee vehicle 115 searches for other vehicles 110 in the vicinity and selects a vehicle having the same traveling direction as that of the initial route 111 and having traveling characteristic information similar to that of the vehicle (host vehicle 11) of the transmission source of the tablet information 50 from among the detected other vehicles 110 as a new consignee vehicle 116.

When the consignee vehicle 116 is newly selected, the tablet information 50 is transferred to the new consignee vehicle from the consignee vehicle 115 predicted to leave the initial route 111. The new consignee vehicle 116, which has received the tablet information 50, transmits the position information 55 to the vehicle (host vehicle 11) of the transmission source of the tablet information 50. By enabling the tablet information 50 to be transferred in a relay fashion in this way, it is possible to virtually calculate a third required time period that is a required time period when the host vehicle 11 travels the initial route 111 even when the consignee vehicle 115 leaves the initial route 111. When selecting a consignee vehicle, since priority is given to the other vehicle 110 having traveling characteristic information similar to that of the host vehicle 11, which is the transmission source of the tablet information 50, the required time period for a consignee vehicle to arrive at the destination naturally approximates to the required time period for the host vehicle 11 to arrive at the destination.

Next, a display example using a display 60, which is part of the HMI 30, will be described with reference to FIGS. 6 and 7. The display 60 basically shows a map image 61, which is an image of a map of areas surrounding the host vehicle, on a scale specified by the user. While the navigation system 12 is conducting route guidance, a host vehicle position mark 63 indicating the host vehicle position and a route display 64 indicating the route that the vehicle is traveling are displayed on the map image 61. As described above, when the calculation result of the required time period during which a consignee vehicle is set is notified, if the relative distance between the consignee vehicle and the host vehicle increases, the scale cannot but be reduced in order to display both the position of the consignee vehicle and the position of the host vehicle on the screen of the display 60. When the scale of the map image is made to be smaller than the scale specified by the user and a wide-area map is displayed, it may be difficult to distinguish the road shape in the vicinity of the position of the host vehicle and the traveling direction. Therefore, when the calculation result of the required time period is notified using the map screen, it is desirable to notify the calculation result on a scale specified by the user.

Thus, the notification section 40 displays a mark allows for identification of the result of a comparison between the required time period for the other vehicle and the required time period for the host vehicle, superimposed on the map image.

Figure 6:
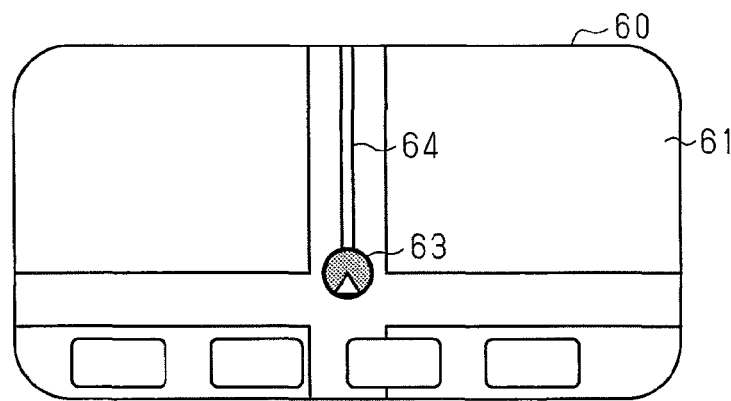
FIG. 6 is a schematic view illustrating a display example notifying a required time period for the host vehicle compared to a required time period for a consignee vehicle to reach a destination.

For example, as shown in FIG. 6, when the required time period for the host vehicle is shorter than the required time period for the consignee vehicle, the color of the host vehicle position mark 63 displayed on the map image 61 is made to be different from the color of the host vehicle position mark 63 when no comparison is made in the required time period of the route. For example, blue is determined as the color of the host vehicle position mark 63.

Figure 7:
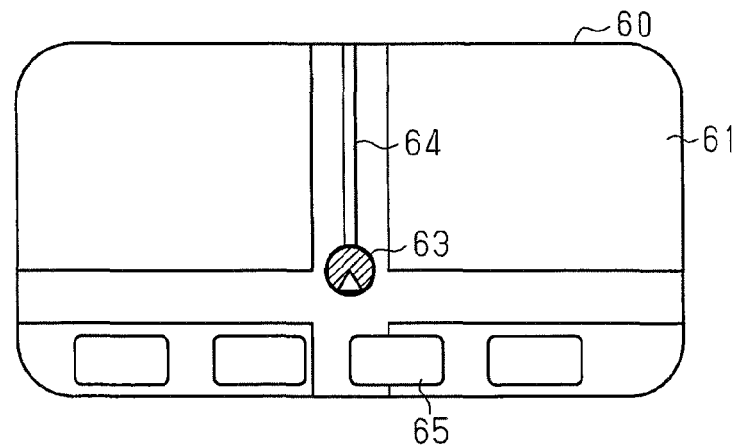
FIG. 7 is a schematic view illustrating a display example notifying a required time period for the host vehicle compared to a required time period for a consignee vehicle to reach a destination.

On the other hand, as shown in FIG. 7, when the required time period for the host vehicle is longer than the required time period for the consignee vehicle, the color of the host vehicle position mark 63 displayed on the map image 61 is determined to be red, for example, a color different from the color in the case where the required time period for the host vehicle is shorter than the required time period for the consignee vehicle.

In addition, when the required time period for the host vehicle is longer than the required time period for the consignee vehicle, the host vehicle position mark 63 displayed on the map image 61 may be made to blink. By changing the display mode of the host vehicle position mark 63 in this way, it is possible to notify the calculation result of the required time period during which the consignee vehicle is set without changing the scale specified by the user.

Moreover, the scale may be changed to one in which the position of the host vehicle and the position of the consignee vehicle are included within the map display region by the user operating predetermined operation buttons (not shown) provided together with the predetermined operation button 65 and the display 60 displayed superimposed on the map image 61.

Figure 8:
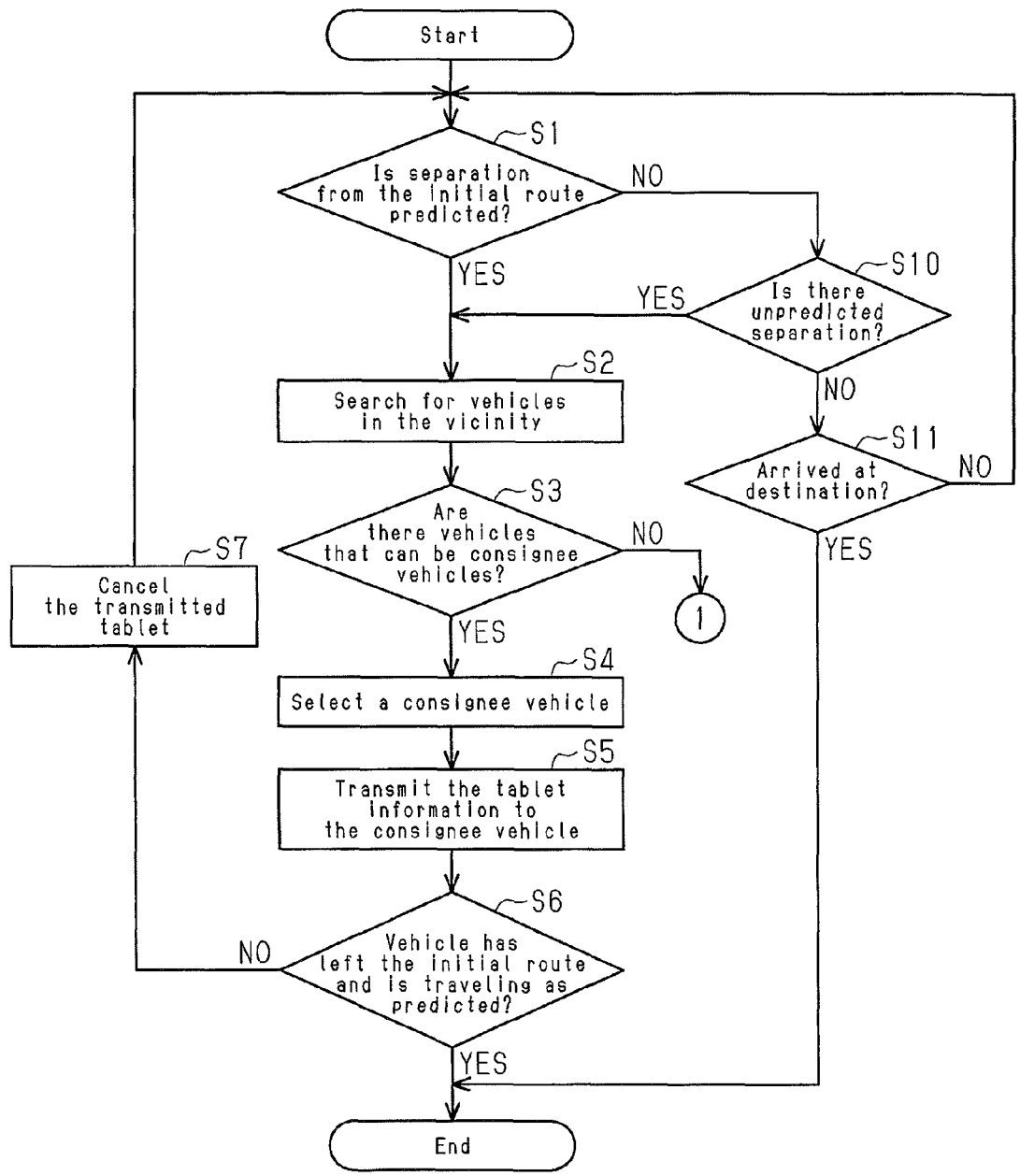
FIG. 8 is a flowchart illustrating a procedure when the navigation system of the host vehicle according to the above-described embodiment transmits tablet information.
Figure 9:
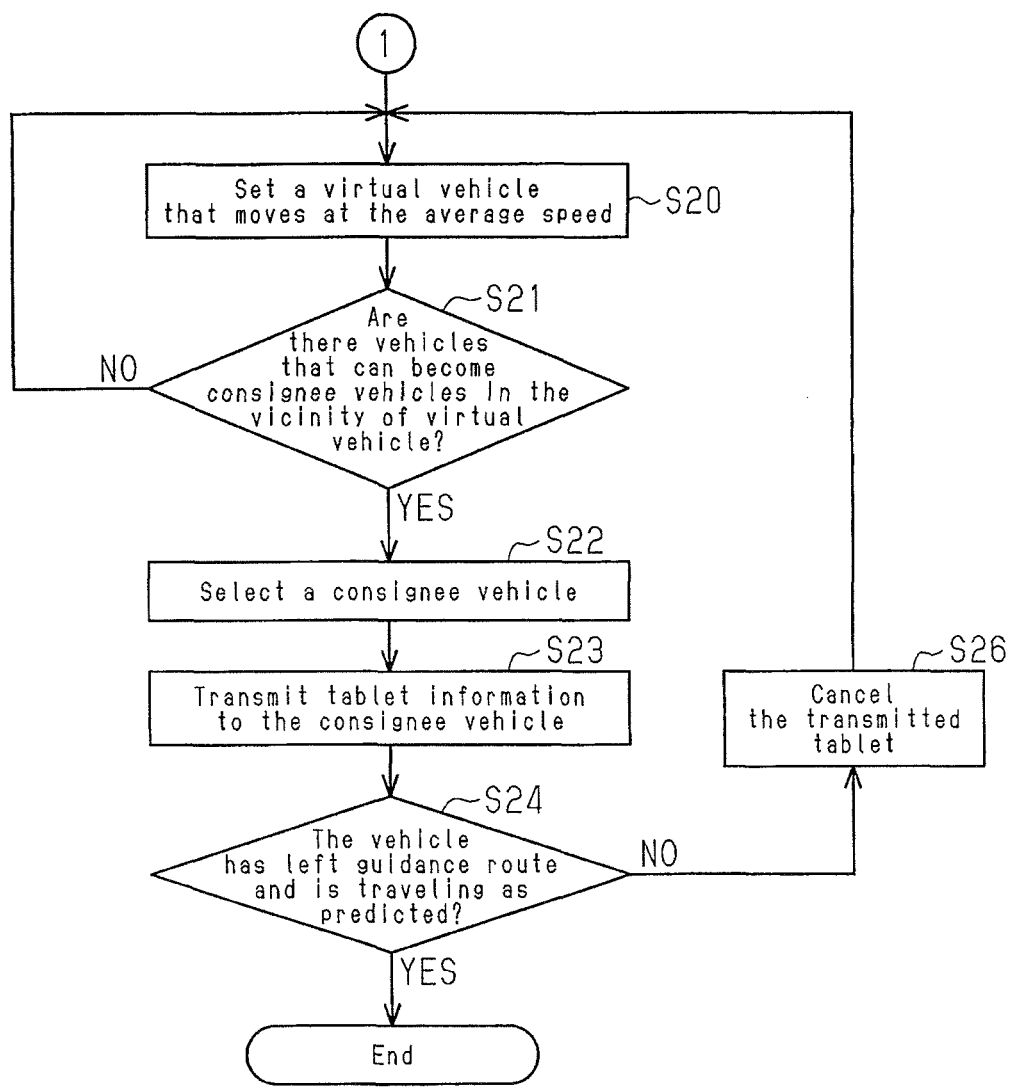
FIG. 9 is a flowchart illustrating a procedure that follows the flowchart shown in FIG. 8.
Figure 10:
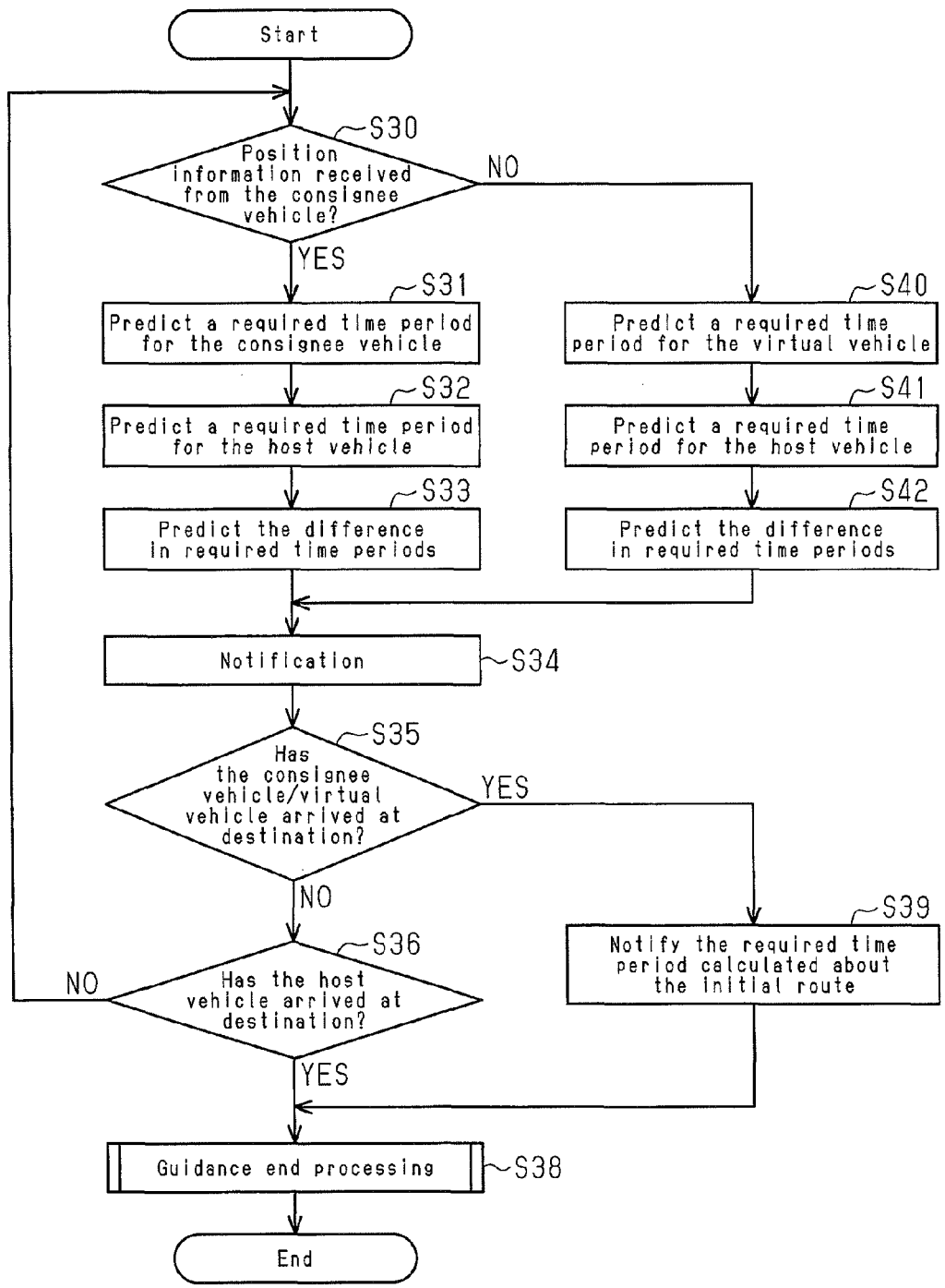
FIG. 10 is a flowchart illustrating a procedure when the navigation system of the host vehicle according to the above-described embodiment compares the required time period for the host vehicle with the required time period for a consignee vehicle and provides notice of the comparison result.

Next, operation of the navigation system 12 will be described with reference to FIGS. 8 to 10. Suppose the host vehicle 11 equipped with the navigation system 12 is traveling along the initial route found by the route search section 33.

First, a transmission process of the tablet information 50 to the consignee vehicle will be described with reference to FIG. 8. The separation determining section 34 of the navigation controller 20 determines whether separation of the host vehicle 11 from the initial route is predicted (step S1). When the separation from the initial route is not predicted (step S1: NO), the separation determining section 34 determines whether unpredicted separation from the initial route has occurred (step S10). The separation determining section 34 determines whether the host vehicle has actually left the initial route by comparing the position of the host vehicle 11 with the initial route irrespective of the presence or absence of an indicator direction by the directional indicator.

Upon determining that there is no unpredicted separation (step S10: NO), the separation determining section 34 determines whether the host vehicle has arrived at the destination (step S11). When the host vehicle 11 arrives at the destination without leaving the initial route (step S11: YES), the tablet information 50 is not transmitted.

When direction indication is performed for a traveling direction different from the initial route or when direction indication for the same traveling direction as that of the initial route is not performed, the separation determining section 34 determines that separation from the initial route is predicted (step S1: YES).

When separation from the initial route is predicted (step S1: YES) and when unpredicted separation occurs such as when the vehicle turns to the right/left irrespective of the absence of direction indication (step S10: YES), the consignee vehicle determining section 35 searches, through vehicle-to-vehicle communication, for one or more vehicles having a required time period calculation program (step S2). At this time, the consignee vehicle determining section 35 requests route information and traveling characteristic information from the other vehicles, and the other vehicles that have received this request transmit route information on a route set in the host navigation system and traveling characteristic information to the host vehicle.

The consignee vehicle determining section 35 of the host vehicle determines, from the reception result, whether there is any vehicle that can be set as a consignee vehicle (step S3). Upon receiving the route information and the traveling characteristic information, the consignee vehicle determining section 35 determines whether there is any other vehicle having the same traveling direction as the traveling direction of the initial route.

When there is a vehicle that can be set as a consignee vehicle (step S3: YES), the consignee vehicle determining section 35 selects a consignee vehicle from among the other vehicles (step S4). After selecting a consignee vehicle, the tablet consigning section 37 transmits the tablet information 50 to the vehicle selected as a consignee vehicle (step S5). At this time, the tablet consigning section 37 stores the position and the date and time at which the tablet information 50 is transmitted in a storage section.

After transmitting the tablet information 50, the separation determining section 34 determines, using the position of the host vehicle, whether the host vehicle has left the initial route as predicted (step S6). When it is determined in step S10 that unpredicted separation has occurred, step S6 may be omitted. When it is determined that the host vehicle has left the initial route as predicted (step S6: YES), the transmission process of the tablet information 50 is ended.

Upon determining that the host vehicle has actually traveled along the initial route contrary to the prediction (step S6: NO), for example, a case where the direction indication is for a change of lanes or parking on the street, a request for canceling the tablet information 50 already transmitted to a consignee vehicle is transmitted (step S7). The consignee vehicle either returns the tablet information 50 or discards the tablet information 50. After canceling the tablet information 50, the flow returns to step S1 to determine whether or not to leave the initial route.

Next, with reference to FIG. 9, a case will be described in which it is predicted that the host vehicle 11 will leave the initial route (step S1: YES) or a case where there is no other vehicle that can be set as a consignee vehicle in the vicinity of the host vehicle 11 despite the fact that unpredicted separation from the initial route has occurred (step S10: YES).

When it is predicted that the host vehicle 11 will leave the initial route or when an unpredicted separation from the initial route has occurred, if the consignee vehicle determining section 35 determines that there is no other vehicle that can be set as a consignee vehicle (step S3: NO in FIG. 8), the consignee vehicle determining section 35 sets a virtual vehicle that moves from the current position of the host vehicle 11 at the average speed (step S20). The average speed is stored in the route search information 23 in association with a link or the like or is acquired from the information providing server 101 and associated with the current position.

While setting the virtual vehicle moving at the average speed, the consignee vehicle determining section 35 determines whether there is any vehicle that can be set as a consignee vehicle in the vicinity of the virtual vehicle (step S21). At this time, when the host vehicle is located apart from the virtual vehicle by a distance greater than a vehicle-to-vehicle communicable distance, the consignee vehicle determining section 35 searches for a vehicle that can be set as a consignee vehicle through communication via the center 100 or the like.

Upon determining that there are other vehicles that can be set as consignee vehicles in the vicinity of the virtual vehicle (step S21: YES), the consignee vehicle determining section 35 selects a consignee vehicle from among those other vehicles (step S22) and transmits the tablet information 50 to the selected consignee vehicle (step S23). The tablet information 50 is transmitted mainly through communication via the center 100.

After transmitting the tablet information 50, the separation determining section 34 determines, using the position of the host vehicle, whether the host vehicle has left the initial route as predicted (step S24). Upon determining that the host vehicle has left the initial route as predicted (step S24: YES), the separation determining section 34 ends the transmission process on the tablet information 50.

When the separation determining section 34 determines that the host vehicle has traveled along the initial route contrary to the prediction (step S24: NO), the tablet consigning section 37 transmits a request for canceling the tablet information 50 already transmitted to the consignee vehicle (step S26). The consignee vehicle either returns the tablet information 50 or discards the tablet information 50.

When the tablet information 50 is canceled (step S26) and when there is no other vehicle that can be a consignee vehicle in the vicinity of the virtual vehicle (step S21: NO), a vehicle that can be a consignee vehicle is searched for (step S21) while a virtual vehicle that moves at the average speed is being set (step S20). These steps S20 to S26 end when the host vehicle 11 arrives at the destination. That is, when the host vehicle 11 arrives at the destination without any vehicle that can be set as a consignee vehicle in the vicinity of the virtual vehicle, the process of transmitting the tablet information 50 is ended.

The host vehicle 11 itself can become the transmission source of the tablet information 50 and at the same time can also function as a consignee vehicle for other vehicles. When the host vehicle 11 is selected as a consignee vehicle, it is determined whether the host vehicle 11 will leave the initial route indicated by the initial route information 52 included in the tablet information 50 while transmitting position information to the vehicle that is the transmission source of the tablet information 50.

Next, a comparison of required time periods of the route and the notification process thereof will be described with reference to FIG. 10. The tablet position determining section 38 of the navigation system 12 of the host vehicle determines whether position information has been received from the consignee vehicle (step S30). Upon determining that the position information has been received from the consignee vehicle (step S30: YES), the required time calculator 39 calculates the remaining distance from the position of the consignee vehicle to the destination, divides the remaining distance by the average speed and predicts a required time period for the consignee vehicle to arrive at the destination (step S31).

Furthermore, the required time calculator 39 calculates the remaining distance from the position of the host vehicle to the destination, divides the remaining distance by the average speed, and predicts a required time period for the host vehicle to arrive at the destination (step S32).

The required time calculator 39 predicts, from the required time period for the host vehicle and the required time period for the consignee vehicle, the difference therebetween (step S33). Based on the difference in the required time periods, the notification section 40 provides notice of it via the HMI 30 (step S34). At this time, the notification section 40 outputs speech like "This route precedes the initial route by 10 minutes" from the speaker or changes the display mode of the host vehicle position mark 63 displayed on the screen of the display 60.

The tablet position determining section 38 determines whether the consignee vehicle has arrived at the destination (step S35). Also when there is no other vehicle that can be set as a consignee vehicle and a virtual vehicle is set, the tablet position determining section 38 determines whether the virtual vehicle has arrived at the destination. Whether the consignee vehicle has arrived at the destination can also be determined from the position of the consignee vehicle, but if the tablet information 50 is transmitted from the consignee vehicle when the consignee vehicle arrives at the destination, whether the consignee vehicle has arrived at the destination can also be determined based on the presence or absence of the received tablet information 50. Upon determining that the consignee vehicle or virtual vehicle has arrived at the destination (step S35: YES), if the host vehicle is traveling the initial route, the fact that the vehicle has arrived at the destination or a required time period when the vehicle travels the initial route is notified (step S39).

Upon determining that the consignee vehicle has not arrived at the destination (step S35: NO), the host vehicle position identification section 32 determines whether the host vehicle has arrived at the destination (step S36). When the host vehicle has not arrived at the destination (step S36: NO), the flow returns to step 30 to determine whether position information has been received from the consignee vehicle.

Upon determining that the host vehicle has arrived at the destination (step S36: YES), the required time calculator 39 performs a guidance end process (step S38), and ends the process. That is, when the consignee vehicle arrives at the destination before the host vehicle 11, the host vehicle 11 can receive the tablet information 50 transmitted from the consignee vehicle, whereas when the host vehicle 11 arrives at the destination first, the host vehicle 11 may not be able to receive the tablet information 50 transmitted from the consignee vehicle depending on the condition of the navigation system 12. Therefore, returning of the tablet information 50 from the consignee vehicle may be stopped or the navigation system 12 may be maintained, even after arriving at the destination, in a standby state ready to receive the tablet information 50. By maintaining the navigation system 12 in the standby state, even when the consignee vehicle arrives at the destination after the host vehicle, if the navigation system 12 is restarted, it is possible to compare the required time period when the host vehicle leaves the initial route and the required time period when the host vehicle does not leave the initial route.

On the other hand, when the tablet position determining section 38 determines that no position information has been received from the consignee vehicle (step S30: NO), the required time calculator 39 predicts a required time period for the virtual vehicle (step S40). The required time calculator 39 predicts a required time period for the host vehicle to arrive at the destination (step S41), and also predicts, from the required time period for the host vehicle and the required time period for the virtual vehicle, the difference therebetween (step S42). The notification section 40 provides notice of the difference in the required time periods via the HMI 30 (step S34).

By causing the setting of consignee vehicles to continue in a relay fashion in this way, even when a consignee vehicle leaves the initial route set in the host vehicle, it is possible to virtually calculate a required time period when the host vehicle travels the initial route.

When selecting a consignee vehicle, vehicles having traveling characteristic information similar to the traveling characteristic information of the host vehicle are preferentially designated as consignee vehicles, and it is therefore possible to obtain a required time period close to one in a case in which the host vehicle actually travels the initial route.

As described above, the navigation system according to the present embodiment achieves the following advantages.

(1) Position information is acquired preferentially from other vehicles having traveling characteristic information similar to that of the host vehicle from among one or more vehicles that pass through a point at which the host vehicle leaves the initial route and travel toward the direction of the initial route. That is, this position information reflects a traveling characteristic similar to that of the host vehicle and also reflects a traffic situation or the like of the initial route. Therefore, by calculating a required time period for the vehicle to arrive at the destination using this position information, it is possible to obtain a result similar to that in a case in which the host vehicle actually moves along the initial route. Therefore, the user can determine the appropriateness of an alternative route selected by the user through a comparison between the actually required time period for the vehicle to arrive at the destination along the alternative route and the required time period virtually calculated regarding the initial route.

(2) Even when another vehicle that receives the tablet information 50, which is notification consignment, and notifies the required time calculator 39 of the position information leaves the initial route directed to the destination, the tablet information 50 is transmitted to another vehicle having traveling characteristic information similar to that of the host vehicle. Therefore, it is possible to exchange the tablet information 50 in a relay fashion among other vehicles having traveling characteristics similar to that of the host vehicle, and it is thereby possible to obtain results similar to results in a case in which the host vehicle actually moves along the route.

(3) As the host vehicle moves away from a consignee vehicle, the scale of the map tends to decrease to display their positions simultaneously within one map image, and a wide-area map needs to be displayed. When the scale of the map is smaller than the scale specified by the user, the function that should originally guide the route up to the destination may not be performed. In this respect, the above-described embodiment displays, on the map image, the host vehicle position mark 63, which allows comparison results of predicted required time periods to be identified and can thereby notify the user of the difference in the predicted required time periods without changing the scale of the map image.

(4) The traveling characteristic information 25 includes vehicle static information 26, which is static information related to the host vehicle, vehicle dynamic information 27, which is changing information related to the host vehicle including the most recent average speed and the number of occupants, and user information 28, which is information related to the user who drives the host vehicle. Thus, by using position information of the consignee vehicle having traveling characteristic information similar to the traveling characteristic information 25 of the host vehicle, it is possible to obtain results similar to results in a case in which the host vehicle actually moves along the route.

Second Embodiment

A navigation system according to a second embodiment will now be described. The differences from the first embodiment will be mainly discussed. The basic configuration of the navigation system of the present embodiment is the same as that of the first embodiment, and redundant descriptions will be omitted.

The navigation system according to the present embodiment is different from the navigation system according to the first embodiment in that a comparison is made among required time periods on a plurality of routes, which are routes from a first point to a second point and are found under different conditions.

The route search section 33 of the navigation controller 20 searches for the route from the place of departure to the destination under different conditions. Examples of the search conditions include a traveling distance, type of road such as a general road or expressway, tolls, the widths of roads, presence or absence of congestion or crowding, ease of driving. The route search section 33 outputs the search result to the HMI 30. When a plurality of routes is found, the user selects one route from among the routes. Once the user selects the route, the route search section 33 outputs a map image or speech via the HMI 30 and guides the selected route.

Figure 11:
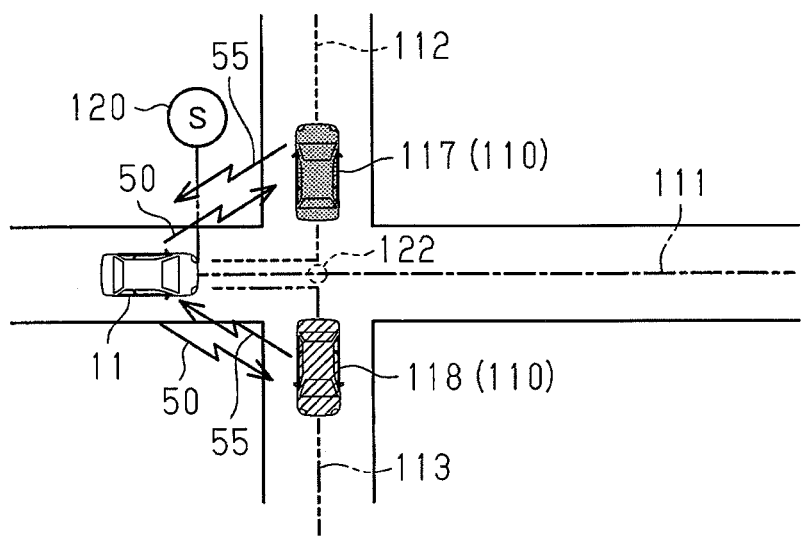
FIG. 11 is a schematic view of a navigation system according to a second embodiment, illustrating a situation in which the navigation system exchanges tablet information with a plurality of consignee vehicles.

As shown in FIG. 11, the consignee vehicle determining section 35 selects, as consignee vehicles 117 and 118, other vehicles 110 having the same traveling directions as the traveling directions of alternative routes 112 and 113 other than an initial route 111 selected by the user. In selecting consignee vehicles, vehicles are preferentially selected that have traveling characteristics similar to that of the host vehicle. The time at which a consignee vehicle is selected may be the time at which the host vehicle 11 is located in the vicinity of a branch point 122 where the initial route 111 is branched into alternative routes 112 and 113. In this case, before and after or when the host vehicle 11 arrives at the branch point 122, the navigation system 12 of the host vehicle 11 selects a consignee vehicle from among other vehicles that pass through the branch point 122. The time at which a consignee vehicle is selected may also be the time at which the host vehicle 11 is located in the vicinity of the place of departure 121.

When a consignee vehicle traveling an alternative route is set, the required time calculator 39 of the host vehicle acquires position information from the consignee vehicle and calculates a required time period for the vehicle to arrive at the destination. Furthermore, the required time calculator 39 calculates a required time period for the host vehicle to arrive at the destination.

Figure 12:
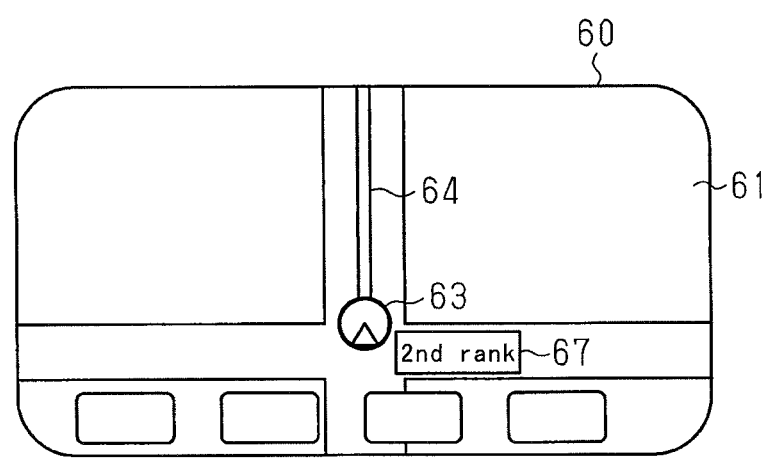
FIG. 12 is a schematic view illustrating a display example in which the navigation system of the above-described embodiment provides notice of a required time period for the host vehicle compared to a required time period for a consignee vehicle to reach a destination.

As shown in FIG. 12, when required time periods of a plurality of consignee vehicles are calculated, a ranking 67 of the host vehicle is displayed next to the host vehicle position mark 63 drawn superimposed on the map image 61 displayed on the display 60. The ranking is assigned to the host vehicle and consignee vehicles in ascending order of required time periods.

When a plurality of routes is found in this way, the user can consider whether the selected route is appropriate by virtually calculating required time periods in a case in which the host vehicle travels routes other than the route selected by the user.

In addition to the above described advantages (2) to (4), the navigation system of the present embodiment achieves the following advantages.

(5) Position information is acquired preferentially from vehicles having traveling characteristic information similar to that of the host vehicle from among one or more vehicles that have passed through the place of departure in the same way as the host vehicle or one or more vehicles that have passed through a branch point from which a plurality of routes is branched from the place of departure to the destination in the same way as the host vehicle. That is, this position information reflects traveling characteristics similar to that of the host vehicle and also reflects traffic situations or the like of routes other than the route selected by the user. Therefore, by calculating the required time period for the vehicle to arrive at the destination using this position information, it is possible to obtain results similar to results in a case in which the host vehicle actually moves along the route. Therefore, the user can determine the appropriateness of the route selected by the user through a comparison between the required time period for the vehicle to actually arrive at the destination and the virtually calculated required time period.

Third Embodiment

A navigation system according to a third embodiment will now be described. The differences from the first embodiment will be mainly discussed. The basic configuration of the navigation system of the present embodiment is the same as that of the first embodiment, and redundant descriptions will be omitted.

The navigation system of the present embodiment is different from the navigation system according to the first embodiment in that the navigation system notifies the user of the host vehicle 11 of, from among movement time of sections obtained by dividing a route along which a consignee vehicle, which is a second movable body, passes into a plurality of sections, a section longer than the average movement time period or a section shorter than the average movement time period associated with the sections.

The required time calculator 39 of the navigation controller 20 functions as a movement time period calculator, the average movement time acquiring section, and a traveling result evaluation section. This required time calculator 39 calculates a movement time for a consignee vehicle for each of the sections into which the initial route is divided from the traveling result of the consignee vehicle. The traveling result of the consignee vehicle is position information notified from the consignee vehicle. The sections into which the initial route is divided may be sections centered on not only links but also nodes or may be sections obtained by dividing the initial route into equal intervals. When the sections are set as sections centered on nodes, dwelling time periods at intersections or branch points associated with the nodes are calculated as movement time, for example.

For example, at time at which the consignee vehicle arrives at the destination, the required time calculator 39 acquires the average movement time for each section included in the route search information 23 stored in the map information storage section 21 or the average movement time for each section registered in the information providing server 101. The required time calculator 39 compares the calculated movement time and the acquired average movement time for each section, and searches for at least one of a section in which the calculated movement time is shorter than the average movement time and a section in which the calculated movement time is longer than the average movement time. At this time, when the consignee vehicle arrives at the destination earlier than the host vehicle, a section in which the calculated movement time is shorter than the average movement time may be searched for in order to notify the user of which section becomes a factor of advancing the required time period. When the consignee vehicle arrives at the destination later than the host vehicle, a section in which the calculated movement time is longer than the average movement time may be searched for in order to notify the user of which section becomes a factor of delay. Alternatively, irrespective of whether arrival of the consignee vehicle is earlier or later than the host vehicle, both sections may be searched for. The section detected in this search is notified to the user of the host vehicle 11 by the notification section 40.

Figure 13:
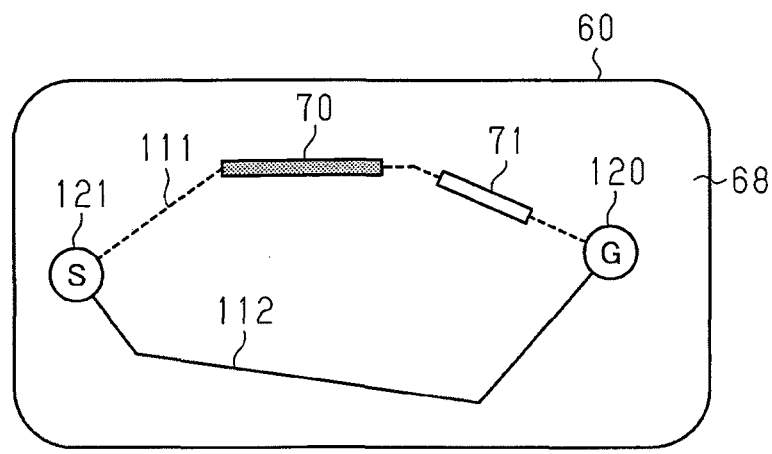
FIG. 13 is a schematic view of a navigation system according to a third embodiment, illustrating a display example in which the navigation system provides notice of a required time period for the host vehicle compared to a required time period for a consignee vehicle to reach a destination.

FIG. 13 shows an example in which the screen of the display 60 displays both a section in which the calculated movement time is shorter than the average movement time and a section in which the calculated movement time is longer than the average movement time. This route evaluation screen 68 is a screen displayed aside from the map image illustrating the vicinity of the host vehicle. The route evaluation screen 68 displays a short-time section 70, in which the movement time is shorter than the average movement time, and a long-time section 71, in which the movement time is longer than the average movement time of the initial route 111, in different display modes.

Alternatively, the notification section 40 may output speech like "there is a delay on the initial route, or Route 1" from the speaker, which is part of the HMI 30. Alternatively, the notification section 40 may also show a guide display like "there is a delay on initial route, or Route 1" superimposed on the map image.

When the host vehicle arrives at the destination earlier than the consignee vehicle and the guidance of the navigation system 12 ends before the consignee vehicle arrives at the destination, the navigation system 12 remains in a standby state without shutting down to continue receiving position information from the consignee vehicle and thereby calculates a movement time based on a traveling result. Alternatively, when the information providing server 101 receives position information from the consignee vehicle, stores the position information in the storage section and the navigation system 12 starts, the information providing server 101 may transmit the position information 55 to the navigation system 12.

In addition to the above described advantages (1) to (4), the navigation system of the present embodiment achieves the following advantage.

(6) Based on the movement result of the consignee vehicle, the user is notified of a section in which the actual movement time is longer than the average movement time or a section in which the actual movement time is shorter than the average movement time. Therefore, the user of the host vehicle can know, by figuring out which of the actual required time period for the user to arrive at the destination or the required time period for the same user to arrive at the destination passing through an alternative route is longer or shorter, which section becomes a factor of delay or a factor of advancing the required time period when passing through the alternative route.

Other Embodiments

The above described embodiments may be modified as follows.

The navigation system 12 may calculate a required time period when returning to the initial route after going through a facility or the like along the initial route or a required time period when returning to the initial route without going through any facility or the like. For example, when the host vehicle goes through a service area or a parking area on an expressway, the separation determining section 34 of the navigation system 12 assumes that the host vehicle has temporarily leaved the initial route. The consignee vehicle determining section 35 sets a vehicle having a traveling characteristic similar to that of the host vehicle from among one or more vehicles traveling the initial route without going through the service area or parking area as a consignee vehicle. When the consignee vehicle goes through a facility along the initial route, the consignee vehicle transmits the tablet information 50 to another vehicle and designates the new vehicle as a consignee vehicle. The required time calculator 39 receives position information from the consignee vehicle and calculates a required time period for the host vehicle to arrive at a destination after going through a facility and a required time period for the host vehicle to travel the initial route without going through the facility or the like. The notification section 40 provides notice of those required time periods. This allows the user to compare the required time period required when going through a facility and the required time period without going through the facility or the like.

When selecting a consignee vehicle, the consignee vehicle determining section 35 may select a plurality of vehicles as consignee vehicles. When two or more vehicles are selected as consignee vehicles, the host vehicle 11 acquires position information from those consignee vehicles 115. The required time calculator 39 of the host vehicle 11 calculates a required time period when the host vehicle 11 travels the initial route using, of the consignee vehicles 115, the position of the first consignee vehicle, the position of a following consignee vehicle and an intermediate position or calculates a required time period when the host vehicle travels the initial route using the position of the first consignee vehicle. When a plurality of vehicles is selected as consignee vehicles in this way, even if some of them leave the initial route, it is possible to calculate the required time period using the positions of the remaining consignee vehicles.

The first point, which is the starting point to compare required time periods of a route, is assumed to be a point at which the vehicle leaves the initial route according to the first embodiment and is assumed to be a place of departure of the route according to the second embodiment. In addition, the first point may be any given point set by the user.

In the above-described embodiments, the second point, which becomes an end point to compare required time periods of a route, is assumed to be a destination. In addition, the second point may be a merging point between the route the host vehicle is traveling and the route the consignee vehicle is traveling or any given point set by the user.

In the above-described embodiments, the traveling characteristic information 25 is assumed to be information including both a characteristic of a vehicle and a characteristic of the user who drives the vehicle, but the traveling characteristic information 25 may include at least one of the characteristic of a vehicle and the characteristic of the user who drives the vehicle.

In the above-described respective embodiments, priority is set in each item indicating the characteristic of the vehicle and the characteristic of the user, but priority does not necessarily need to be set. For example, of the one or more vehicles designated as consignee vehicles, vehicles satisfying most items may be designated as consignee vehicles.

Regarding whether the host vehicle has left the initial route, it is possible to determine whether the host vehicle has left the initial route by subjecting image data picked up by a vehicle-mounted camera to image processing using a known method.

When the host vehicle 11 is temporarily parked at a facility such as a service area or a parking area along the route, a parking time period may be counted and the parking time period may be subtracted from a required time period for the host vehicle 11 to arrive at the destination.

In the above-described respective embodiments, vehicle-to-vehicle communication is used when the tablet information 50 is exchanged if the communication distance is relatively short, but wireless communication may also be performed via a transmitter installed on a roadside or a server at the center.

Figure 14:
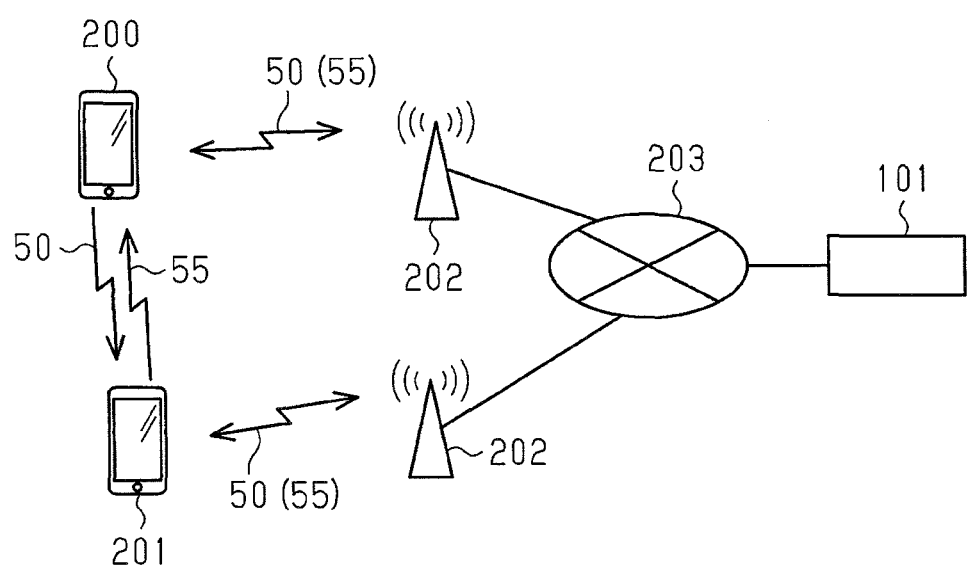
FIG. 14 is a schematic diagram of a navigation system according to a modification, illustrating an information network including a portable information terminal equipped with a navigation system and a portable information terminal, to which notification of position information is consigned.

As shown in FIG. 14, the movable body may be a portable information terminal 200 carried by a user. In this case, the movement characteristic information indicates a tendency of walking or the age or the like of the user who owns the portable information terminal. The tendency of walking includes a waking speed, tendency of preferring sidewalks along a main road or tendency of preferring narrow streets. A required time period calculation program is stored and an initial route from a first point to a second point are set in the portable information terminal 200. When the user leaves this initial route, the same required time period calculation program is stored and portable information terminal 201 owned by another user walking along the initial route is searched for. The portable information terminal 201 is searched for using wireless communication carried out between the portable information terminals 200 and 201 or communication with the information providing server 101 connected via a network 203 of a base station 202 and a public channel or the like. The tablet information 50 is transmitted to the portable information terminal 201 having movement characteristic information similar to that of the user out of the detected one or more portable information terminals 201. The portable information terminal 201 that has received the tablet information 50 transmits position information 55 to the portable information terminal 200, which is the transmission source of the tablet information 50. Alternatively, the portable information terminal 200 may be owned by the user who moves from the first point to the second point using means of transportation such as railroad. In this case, the movement characteristic information indicates means of transportation or the like the user owning the portable information terminal frequently uses. The portable information terminal 200 stores a required time period calculation program and an initial route from a first point to a second point including a movement section of the means of transportation is set therein. By this means, the user can appropriately determine the appropriateness of the route selected by the user through a comparison between the required time period required to arrive at the second point and a virtually calculated required time period.

Therefore, the present examples and embodiments are to be considered as illustrative and not restrictive and the invention is not to be limited to the details given herein, but may be modified within the scope and equivalence of the appended claims.

The invention claimed is:

1. A navigation system capable of acquiring a first required time period and a second required time period, wherein the first required time period is a time period required for a first movable body to arrive at a second point from a first point via a first route and the second required time period is a time period required for a second movable body moving along a second route different from the first movable body to arrive at the second point from the first point, the navigation system comprising:

a storage section, which stores information indicating respective movement characteristics of the first movable body and the second movable body, wherein the information is defined in advance and the movement characteristics are classified by one or more factors that affect an arrival time when the first movable body and the second movable body travel an identical route;

a movement characteristic information acquiring section configured to acquire the information indicating the movement characteristics of the first movable body and the information indicating the movement characteristics of the second movable body from the storage section; and a required time calculator, which calculates a third required time period which is a virtually required time period when the first movable body is assumed to arrive at the second point after movement the second route, which is different from the first route, along which the first movable body actually has moved, wherein the second movable body, which has passed through the first point as in the case of the first movable body, is one or more second movable bodies, the required time calculator is configured to preferentially acquire position information from the second movable body having the information indicating a movement characteristic similar to the information indicating the movement characteristic of the first movable body from among the one or more second movable bodies, and the required time calculator is configured to calculate the third required time period using the acquired position information.

2. The navigation system according to claim 1, further comprising a notification consignment transmitting section, which transmits notification consignment to the one or more second movable bodies, which have the information indicating a movement characteristic similar to the information indicating the movement characteristic of the first movable body, wherein the second movable body that has received the notification consignment is consigned to notify the required time calculator of the position information, when the second movable body that has received the notification consignment leaves the second route directed to the second point, the notification consignment transmitting section generates the notification consignment such that the second movable body acquires the information indicating movement characteristics of other one or more movable bodies on the second route directed to the second point, and the notification consignment transmitting section generates the notification consignment such that the second movable body leaving the second route transmits the notification consignment to a mobile unit having the information indicating a movement characteristic similar to that of the first movable body from among the other one or more movable bodies.

3. The navigation system according to claim 1, wherein the required time calculator is configured to predict the first required time period using the position of the first movable body, the required time calculator is configured to predict the second required time period using the position information notified from the second movable body, and the navigation system further comprises a display section, which is configured to display a mark indicating a result of comparison between the first required time period and the second required time period on a map image.

4. The navigation system according to claim 1, wherein the storage section stores, as the information indicating the movement characteristic, information indicating at least one of:

movable body static information, which is static information related to the first movable body and the second movable body;

movable body dynamic information, which is changing information related to the first movable body and the second movable body including an average speed or the number of occupants of the movable bodies; and user information related to the respective users of the first movable body and the second movable body.

5. The navigation system according to claim 1, further comprising:

a movement time calculator, which is configured to calculate a movement time for the second movable body from the movement result of the second movable body, wherein the movement time calculator is configured to calculate a movement time for the second movable body for each of a plurality of sections into which the route the second movable body travels is divided;

an average movement time acquiring section configured to acquire an average movement time associated with the section; and a traveling result evaluation section configured to compare a movement time calculated for each section and the average movement time, wherein the traveling result evaluation section is configured to notify the user of the first movable body of a section longer than the average movement time or a section shorter than the average movement time.

* * * * *